Jan. 18, 1955  J. N. J. LEEMAN  2,699,870
APPARATUS FOR SEPARATING SOLID PARTICLES
Filed July 1, 1953  2 Sheets-Sheet 1

Inventor
Jan N. J. Leeman
By Cushman, Darby & Cushman
Attorneys

Jan. 18, 1955    J. N. J. LEEMAN    2,699,870
APPARATUS FOR SEPARATING SOLID PARTICLES
Filed July 1, 1953    2 Sheets-Sheet 2

Inventor
Jan N.J. Leeman
By Cushman, Darby & Cushman
Attorneys

United States Patent Office 2,699,870
Patented Jan. 18, 1955

2,699,870

APPARATUS FOR SEPARATING SOLID PARTICLES

Jan N. J. Leeman, Brunssum, Netherlands, assignor to Stamicarbon N. V., Heerlen, Netherlands Application July 1, 1953, Serial No. 365,479

Claims priority, application Netherlands July 7, 1952

8 Claims. (Cl. 209—172)

This invention relates to an apparatus for separating solid particles with the aid of a heavy medium according to the so called float-and-sink method into a specifically light fraction and a specifically heavy fraction. More particularly, the invention relates to an improvement with respect to that type of float-and-sink apparatus which comprises a tank for receiving a heavy separating medium, which tank has an upwardly inclined bottom to provide a deep and a shallow end, and a spiral conveyor for moving settled particles upwardly along said inclined bottom.

In apparatus of the aforesaid type, employed hitherto, the settled particles have been discharged at the shallow end of the tank in a direction parallel to the longitudinal axis of the tank. Therefore, the inclined bottom wall of the tank extended upwards above the liquid level in order to permit liquid raised from the shallow end of the tank with the discharged particles to flow back into the tank. This construction required considerable space and, furthermore, difficulties have been encountered in conveniently mounting the driving mechanism of the spiral conveyor on account of the discharge of the settled particles axially of the conveyor.

An object of the present invention is to provide a compact and efficient apparatus for the separation of mixtures of solid particles according to the float-and-sink method.

Another object of the invention is to provide an apparatus for the separation of mixtures of solids and which apparatus requires less space than known apparatus of corresponding capacity.

Still another object of the invention is to provide an apparatus for the separation of solids in which both the float-and-sink fractions are discharged in the same direction.

A further object of the invention is to provide an apparatus for the separation of solids in which the driving mechanism for rotating the spiral conveyor which discharges the sink fraction can be mounted close to the end wall of the separator.

A still further object of the invention is to provide an apparatus for the separation of solids in which the float fraction is discharged by means of a paddle wheel device of such construction that both it and the spiral conveyor for removing the sink fraction easily can be lifted out of the separator when the apparatus is not in use.

Other objects of the invention will be apparent from the following specification and the accompanying drawings, in which drawings.

Figure 1:
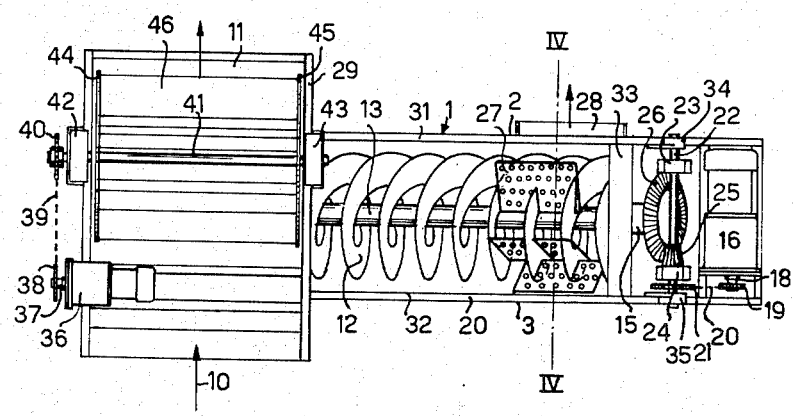
Figure 1 is a plan view of the apparatus of the invention.
Figure 2:
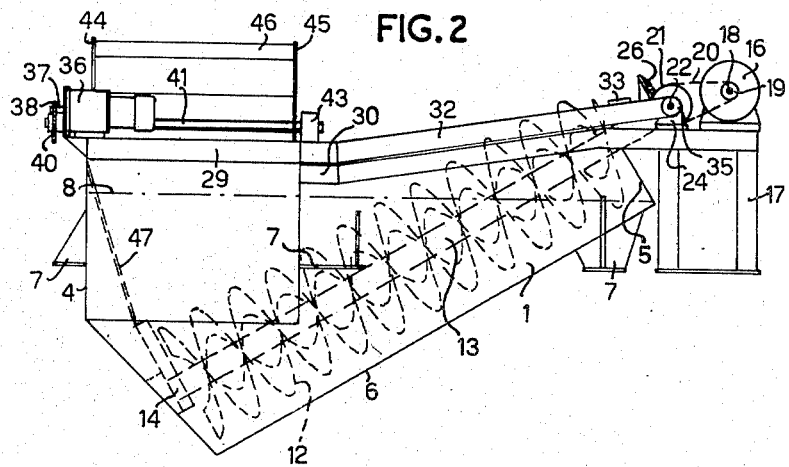
Figure 2 is a side view.
Figure 3:
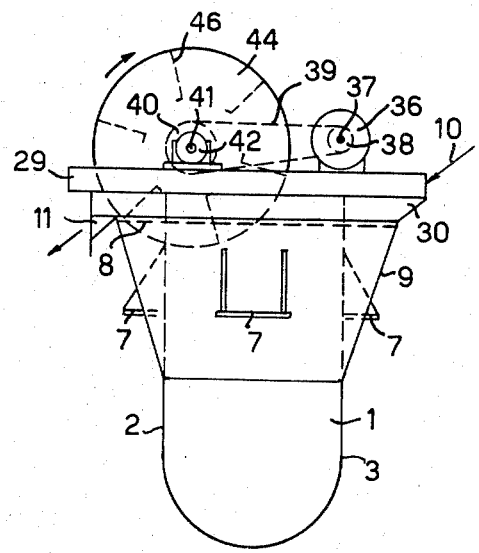
Figure 3 is a front elevation looking toward Figure 1 from the left.
Figure 4:
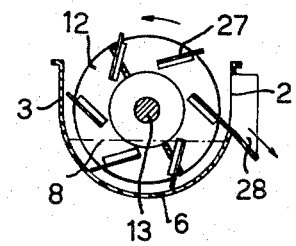
Figure 4 is a vertical sectional view on the line 4—4 of Figure 1.

Referring to Figures 1 to 3, the separating tank 1 comprises two vertical side walls 2 and 3, end walls 4 and 5 and a sloping bottom 6, inclined upwardly towards the end wall 5. As shown in Figures 3 and 4, bottom wall 6 is rounded in a plane transverse of the length of tank 1. Brackets 7 are provided on the walls 2 and 3 for supporting the tank on a suitable base.

Tank 1 is filled up to the level 8 indicated in Figures 2 and 3 with a bath having a specific gravity intermediate the specific gravities of the light and heavy components of the mixture to be separated. For example, the bath may be a suspension of magnetite in water, so that the light particles of the mixture to be separated will float while the heavy particles will sink. As shown in Figure 2, the bottom 6 of tank 1 does not extend above the level 8 of the bath.

As appears in Figure 3, at the deep end of tank 1 the upper portion 9 of the side wall 3 is outwardly inclined to form a pocket for receiving the material to be separated, such as raw coal, which is delivered to tank 1 at 10 by a suitable means, such as a launder. Opposite the infeed 10 side wall 2 also is outwardly inclined and is provided with an overflow or weir 11 for discharge of the floating particles, such as cleaned coal.

A spiral conveyor 12 is secured to a shaft 13 which extends parallel to the length of the bottom wall 6, shaft 13 being journalled in bearings 14 and 15 near the end walls 4 and 5, respectively. The spiral conveyor 12 may be rotated by means of a motor 16, which is mounted near the shallow end of the tank on a suitable support 17. Motor 16 has its shaft 18 provided with a sprocket wheel 19 which, through a chain 20, drives a sprocket wheel 21 fixed on a shaft 22. Shaft 22 is parallel to shaft 18, being journalled in bearings 23 and 24 secured to support 17. A bevel gear 25 keyed on shaft 22 cooperates with a large bevel gear 26 secured to the shaft 13 of spiral conveyor 12. Conveyor 12 is rotated in such direction that the sink particles are transported upwardly towards the shallow end of tank 1.

At the upper end of spiral conveyor 12 plates or blades 27 are provided between adjacent coils of the conveyor helix. As shown in Figure 4, the plates 27 lie in planes parallel to the axis of shaft 13 at an acute angle to a radius. The outer edges of the plates 27 trail their inner edges. As indicated in Figure 4, the outer edges of the plates 27 lie outwardly of the periphery of the coils of the helical conveyor 12, so that the plates scrape the interior of the bottom wall 6 to carry heavy particles upwardly. The angularity of the plates permits particles to slide from them and through the overflow 28 in the side wall 2 of tank 1, all as indicated by the arrows in Figure 4. The plates 27 are perforated (Figure 1) to facilitate the draining of liquid back into the tank from the particles lifted for discharge through 28. Due to the lateral discharge at 28 of the heavy or sink fraction the tank 1 and conveyor 12 may be about five feet shorter than, or only 80% as long as, apparatus of corresponding capacity constructed in the previously known manner. Also, with the apparatus of the invention, the driving mechanism for the spiral conveyor may be mounted close to one end of the tank.

Also, the invention enables both the float and sink fractions to be discharged in the same direction from tank 1, that is, both from the same side of the apparatus, which makes it easier to keep the discharging products under observation and facilitates a more economical use of the available space in a washery.

As shown in Figure 1, the spiral conveyor 12 preferably is provided with two or more interleaved helices. The settled particles which are pushed upwards along the bottom of the tank tend to accumulate in the trailing portion of the spaces between the helix turns, i. e., against the helix faces which face the shallow end of the tank, and the provision of two or more helices provides a more even distribution of the particles across the width of the overflow 28. Also, it is easier for entrained liquid to flow back into the tank.

A frame 29 rests upon the upper edges 30 of the side walls of the separator. Frame 29 includes two parallel beams 31 and 32 which are connected by means of a transverse beam 33. The beams 31 and 32 are pivotally supported by bearings 34 and 35 mounted upon the ends of the shaft 22. Also mounted upon frame 29 is a motor 36 having a shaft 37 which is provided with a sprocket wheel 38. The sprocket wheel 38 drives a chain 39 which engages a sprocket wheel 40 keyed on a shaft 41. The shaft 41 is journalled in bearings 42 and 43 secured to frame 29 and carries two spaced circular plates or discs 44 and 45 interconnected by a series of radially arranged plates or scoops 46 so as to form a paddle wheel. In their lowermost position the scoops dip in the upper portion of the bath in the tank, the paddle wheel being driven in such direction that the lighter particles floating on the bath will be pushed toward overflow 11, all as indicated by the arrows in Figure 3.

In case the apparatus is not required to be operated for a long period, for instance, during the interruption of operation at night, conveyor 12 may be lifted out of the bath by swinging the conveyor 12 upwardly about the swivel bearing formed by the shaft 22. This prevents conveyor 12 from becoming buried in the settled suspension particles. The lower bearing 14 of shaft 13 is supported in a yoke 47 shown in Figure 2 and which depends from the frame 29. Engagement of the frame 29 with tank 1 thereby properly positions conveyor 12 for separating action. As stated above, frame 29 is pivotally mounted with respect to the shaft 22 by means of the beams 31 and 32 and the bearings 34 and 35. This construction enables the frame 29 with the paddle wheel, spiral conveyor 12 and motor 36 to be swung upwards together about the shaft 22 to thereby lift the spiral conveyor out of the tank.

The terminology used in the specification is for the purpose of description and not of limitation, the scope of the invention being defined in the claims.

I claim:

1. In an apparatus for separating mixtures of particles into a fraction containing floating particles of low specific gravity and another fraction containing particles of high specific gravity, a tank for receiving a separating bath, said tank including side and end walls and a bottom wall inclined upwardly to provide a deep end and a shallow end, means for introducing the mixture to be separated into the deep end of said tank, means for removing floating particles from the tank, a helical conveyor rotatable about an axis parallel to said tank bottom wall for moving settled particles axially thereof and upwardly along said bottom wall, said conveyor being provided at its upper end with plates extending between the turns of its helix, said tank being provided with an overflow opening in one side wall and in the path of movement of said plates.

2. An apparatus of the character described in claim 1, wherein said plates are perforated.

3. An apparatus of the character described in claim 1, wherein the spiral conveyor is formed of at least two interleaved helices and said plates extend between the adjacent turns of one of said helices.

4. An apparatus of the character described in claim 1 wherein said plates lie in planes parallel to the axis of said conveyor shaft and are so inclined that the outer edges of said plates trail their inner edges during rotation of said conveyor.

5. An apparatus of the character described in claim 1 including a frame pivoted with respect to said tank and serving as a journal support for said conveyor shaft, a bevel gear mechanism to drive said shaft, the driving shaft of the bevel gear mechanism comprising the hinge axis of said frame.

6. An apparatus of the character described in claim 1, having an overflow for the light fraction provided in the same side wall as the overflow for the heavy particles.

7. An apparatus of the character described in claim 1, having a paddle wheel device provided above the deeper part of the tank for removing the floating particles in a direction perpendicular to the longitudinal axis of said tank.

8. An apparatus of the character described in claim 7, wherein said paddle wheel device is mounted on a frame which is pivoted about an axis connection near the shallow end of said tank.

References Cited in the file of this patent

UNITED STATES PATENTS

| | | |
|---|---|---|
| 466,753 | Hockley | Jan. 5, 1892 |
| 718,557 | Wenzel | Jan. 13, 1903 |
| 1,285,560 | Chase | Nov. 19, 1918 |
| 2,298,332 | Applegate | Oct. 13, 1942 |
| 2,353,152 | Erck | July 11, 1944 |
| 2,463,693 | Huff | Mar. 8, 1949 |
| 2,521,152 | Davis | Sept. 5, 1950 |
| 2,559,403 | Corer | July 3, 1951 |
| 2,653,701 | Heth | Sept. 29, 1953 |